United States Patent
Peng

(10) Patent No.: US 10,524,013 B2
(45) Date of Patent: Dec. 31, 2019

(54) TELEVISION PROGRAM SWITCHING METHOD AND APPARATUS

(71) Applicant: Huawei Technologies Co., Ltd., Shenzhen (CN)

(72) Inventor: Qingquan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 15/535,255

(22) PCT Filed: Dec. 12, 2014

(86) PCT No.: PCT/CN2014/093757
§ 371 (c)(1),
(2) Date: Jun. 12, 2017

(87) PCT Pub. No.: WO2016/090646
PCT Pub. Date: Jun. 16, 2016

(65) Prior Publication Data
US 2017/0324999 A1   Nov. 9, 2017

(51) Int. Cl.
*H04N 21/482* (2011.01)
*H04N 21/434* (2011.01)
(Continued)

(52) U.S. Cl.
CPC ........ *H04N 21/4821* (2013.01); *H04M 11/08* (2013.01); *H04N 5/00* (2013.01);
(Continued)

(58) Field of Classification Search
CPC ......... H04N 21/8352; H04N 21/23608; H04N 21/4344; H04N 21/4821; H04N 11/08; H04N 5/00; H04N 21/4126; H04N 21/84
(Continued)

(56) References Cited

U.S. PATENT DOCUMENTS 6,493,688 B1 * 12/2002 Das .................... H04N 5/44543
706/20
6,785,733 B1 * 8/2004 Mimura .................. H04L 29/06
375/E7.025

(Continued)

FOREIGN PATENT DOCUMENTS

CN     101399992 A    4/2009
CN     101815162 A    8/2010
(Continued)

OTHER PUBLICATIONS

Machine Translation and Abstract of German Publication No. DE102009059281, Jun. 30, 2011, 22 pages.
(Continued)

*Primary Examiner* — James R Sheleheda
*Assistant Examiner* — Franklin S Andramuno
(74) *Attorney, Agent, or Firm* — Conley Rose, P.C.

(57) ABSTRACT

A television program switching method and apparatus, relate to the field of communications network technologies and applicable to television program switching, thereby resolving a problem of cumbersome user operations of viewing television program information. The method includes a program selection instruction entered by a user is received when an electronic program guide (EPG) screen is displayed on a mobile terminal, where the program selection instruction includes a program identifier, and the EPG screen includes at least two program identifiers and first program information corresponding to each program identifier, the EPG is searched for program frequency information corresponding to the program identifier according to the program identifier, and the program frequency information is sent to a to-be-controlled television.

20 Claims, 5 Drawing Sheets

| News Broadcast | Animal World | Kai Men Da Ji |
|---|---|---|
| CCTV-1 | CCTV-2 | CCTV-3 |
| Lecture Room | Sports News | Episode 3 of the TV series *Romance of Our Parents* |
| CCTV-4 | CCTV-5 | CCTV-6 |
| Episode 16 of the TV series *Warriors of Heaven and Earth* | Across the Strait | Approaching Science |
| CCTV-7 | CCTV-8 | CCTV-9 |

CCTV-1

19:00–19:30: *News Broadcast*

19:30–19:40: *Weather Report*

19:40–21:40: Episodes 17 and 18 of the TV series *Warriors of Heaven and Earth*

21:40–23:10: Rebroadcast of *News Broadcast*

(51) Int. Cl.
*H04N 5/00* (2011.01)
*H04N 21/41* (2011.01)
*H04N 21/236* (2011.01)
*H04M 11/08* (2006.01)
*H04N 21/84* (2011.01)

(52) U.S. Cl.
CPC ... *H04N 21/23608* (2013.01); *H04N 21/4126* (2013.01); *H04N 21/4344* (2013.01); *H04N 21/84* (2013.01)

(58) Field of Classification Search
USPC .............................................. 725/35, 48, 52
See application file for complete search history.

(56) References Cited

U.S. PATENT DOCUMENTS

| | | | | |
|---|---|---|---|---|
| 2003/0020744 | A1* | 1/2003 | Ellis | H04H 60/31 715/723 |
| 2010/0088725 | A1* | 4/2010 | Swix | H04N 5/44543 725/43 |
| 2010/0329643 | A1* | 12/2010 | Kuang | H04N 5/781 386/292 |
| 2011/0083145 | A1* | 4/2011 | Cholas | H04N 7/18 725/36 |
| 2012/0222079 | A1* | 8/2012 | Kikuchi | H04N 21/4345 725/118 |
| 2012/0304228 | A1* | 11/2012 | Drazin | H04N 5/44543 725/40 |
| 2014/0101701 | A1* | 4/2014 | DeLaCruz | H04N 5/44543 725/48 |
| 2014/0130100 | A1 | 5/2014 | Wang | |
| 2015/0264445 | A1* | 9/2015 | Lock | H04N 21/482 725/39 |
| 2015/0382068 | A1* | 12/2015 | Shimy | H04N 21/482 725/40 |
| 2016/0014446 | A1* | 1/2016 | Li | H04N 21/42209 725/40 |
| 2016/0286249 | A1* | 9/2016 | Phillips | H04N 21/2385 |
| 2017/0289631 | A1* | 10/2017 | Lee | H04N 21/43 |
| 2018/0338183 | A1* | 11/2018 | Ellis | H04N 5/44543 |

FOREIGN PATENT DOCUMENTS

| | | |
|---|---|---|
| CN | 103369385 A | 10/2013 |
| DE | 102009059281 A1 | 6/2011 |
| EP | 2209309 A1 | 7/2010 |
| WO | 2013110222 A1 | 8/2013 |

OTHER PUBLICATIONS

Foreign Communication From a Counterpart Application, European Application No. 14907799.2, Extended European Search Report dated Oct. 25, 2017, 7 pages.

Machine Translation and Abstract of Chinese Publication No. CN101399992, Apr. 1, 2009, 4 pages.

Machine Translation and Abstract of Chinese Publication No. CN101815162, Aug. 25, 2010, 6 pages.

Machine Translation and Abstract of International Publication No. WO2013110222, Aug. 1, 2013, 10 pages.

Foreign Communication From a Counterpart Application, PCT Application No. PCT/CN2014/093757, English Translation of International Search Report dated Sep. 11, 2015, 2 pages.

Foreign Communication From a Counterpart Application, PCT Application No. PCT/CN2014/093757, English Translation of Written Opinion dated Sep. 11, 2015, 5 pages.

Machine Translation and Abstract of Chinese Publication No. CN103369385, Oct. 23, 2013, 16 pages.

Foreign Communication From a Counterpart Application, Chinese Application No. 201480079346.3, Chinese Office Action dated Mar. 21, 2019, 7 pages.

\* cited by examiner

TELEVISION PROGRAM SWITCHING METHOD AND APPARATUS

CROSS-REFERENCE TO RELATED APPLICATION

This application is a U.S. National Stage of International Patent Application No. PCT/CN2014/093757, filed on Dec. 12, 2014, which is hereby incorporated by reference in its entirety.

TECHNICAL FIELD

The present disclosure relates to the field of communications network technologies, and in particular, to a television program switching method and apparatus.

BACKGROUND

With development of television technologies, a television plays an increasingly important role in daily life, and there are increasingly abundant television channels and television programs. Currently, a user can control a television using a remote control to switch a television program. If a user wants to view television program information of a channel, the user needs to first use the remote control to switch to the channel. When the user wants to search for a television program of interest to the user by viewing television program information, the user needs to frequently switch channels to view television program information corresponding to each channel, and then finds the television program of interest to the user according to the television program information. Therefore, excessively cumbersome user operations of viewing television program information cause poor user experience.

SUMMARY

Embodiments of the present disclosure provide a television program switching method and apparatus, thereby resolving a problem of cumbersome user operations of viewing television program information.

According to a first aspect, an embodiment of the present disclosure provides a television program switching method, the method is applied to a mobile terminal, the mobile terminal includes an electronic program guide (EPG), the EPG includes at least two program identifiers and program frequency information corresponding to each program identifier, and the method includes receiving, when an EPG screen is displayed, a program selection instruction entered by a user, where the program selection instruction includes a program identifier, and the EPG screen includes the at least two program identifiers and first program information corresponding to each program identifier, searching the EPG for program frequency information corresponding to the program identifier according to the program identifier, and sending the program frequency information to a to-be-controlled television.

With reference to the first aspect, in a first possible implementation manner, before receiving, when an EPG screen is displayed, a program selection instruction entered by a user, the method further includes obtaining the EPG from a server or a personal computer (PC).

With reference to the first possible implementation manner of the first aspect, in a second possible implementation manner, before receiving, when an EPG screen is displayed, a program selection instruction entered by a user, the method further includes obtaining an EPG screen generation rule from the server or the PC.

With reference to the second possible implementation manner of the first aspect, in a third possible implementation manner, the EPG further includes second program information corresponding to each program identifier, the second program information includes the first program information, and before receiving, when an EPG screen is displayed, a program selection instruction entered by a user, where the program selection instruction includes a program identifier, the method further includes generating the EPG screen using the at least two program identifiers and the first program information corresponding to each program identifier and according to the EPG screen generation rule.

According to a second aspect, an embodiment of the present disclosure provides a television program switching apparatus, the apparatus is applied to a mobile terminal, the mobile terminal includes an EPG, the EPG includes at least two program identifiers and program frequency information corresponding to each program identifier, and the apparatus includes a receiving unit configured to receive, when an EPG screen is displayed, a program selection instruction entered by a user, where the program selection instruction includes a program identifier, and the EPG screen includes the at least two program identifiers and first program information corresponding to each program identifier, a searching unit configured to search the EPG for program frequency information corresponding to the program identifier according to the program identifier, and a sending unit configured to send the program frequency information found by the searching unit to a to-be-controlled television.

With reference to the second aspect, in a first possible implementation manner, the apparatus further includes an obtaining unit configured to obtain the EPG from a server or a PC.

With reference to the first possible implementation manner of the second aspect, in a second possible implementation manner, the obtaining unit is further configured to obtain an EPG screen generation rule from the server or the PC.

With reference to the second possible implementation manner of the second aspect, in a third possible implementation manner, the EPG further includes second program information corresponding to each program identifier, the second program information includes the first program information, and the apparatus further includes a generation unit configured to generate the EPG screen using the at least two program identifiers and the first program information corresponding to each program identifier and according to the EPG screen generation rule obtained by the obtaining unit.

According to a third aspect, an embodiment of the present disclosure provides a television program switching apparatus, the apparatus is applied to a mobile terminal, the mobile terminal includes an EPG, the EPG includes at least two program identifiers and program frequency information corresponding to each program identifier, and the apparatus includes a memory configured to store information that includes a program instruction, a transceiver configured to receive, when an EPG screen is displayed, a program selection instruction entered by a user, where the program selection instruction includes a program identifier, and the EPG screen includes the at least two program identifiers and first program information corresponding to each program identifier, and a processor, coupled to the memory and the transceiver configured to control execution of the program instruction, and configured to search the EPG for program frequency information corresponding to the program identifier according to the program identifier, where the transceiver is further configured to send the program frequency information found by the processor to a to-be-controlled television.

With reference to the third aspect, in a first possible implementation manner, the transceiver is further configured to obtain the EPG from a server or a PC, and the memory is further configured to store the EPG obtained by the transceiver.

With reference to the first possible implementation manner of the third aspect, in a second possible implementation manner, the transceiver is further configured to obtain an EPG screen generation rule from the server or the PC, and the memory is further configured to store the EPG screen generation rule obtained by the transceiver.

With reference to the second possible implementation manner of the third aspect, in a second possible implementation manner, the EPG further includes second program information corresponding to each program identifier, and the second program information includes the first program information, and the processor is further configured to generate the EPG screen using the at least two program identifiers and the first program information corresponding to each program identifier and according to the EPG screen generation rule.

According to the television program switching method and apparatus provided in the embodiments of the present disclosure, when displaying an EPG screen, a mobile terminal receives a program selection instruction entered by a user, and the program selection instruction includes a program identifier. The mobile terminal searches an EPG for program frequency information corresponding to the program identifier according to the program identifier. Then, the mobile terminal sends the program frequency information to a to-be-controlled television such that the to-be-controlled television switches to a program corresponding to the program frequency information. In comparison with the other approaches in which a user needs to frequently switch channels to view program information corresponding to each channel, in the present disclosure, a mobile terminal displays an EPG screen, and the EPG screen includes at least two program identifiers and first program information corresponding to each program identifier. Therefore, the user can directly view, on the EPG screen, all pieces of program information included in the EPG screen, and select a program of interest to the user. The mobile terminal may control a to-be-controlled television to directly switch to the program selected by the user, thereby resolving a problem of cumbersome user operations of viewing television program information, and improving user experience.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figures 1, 2:
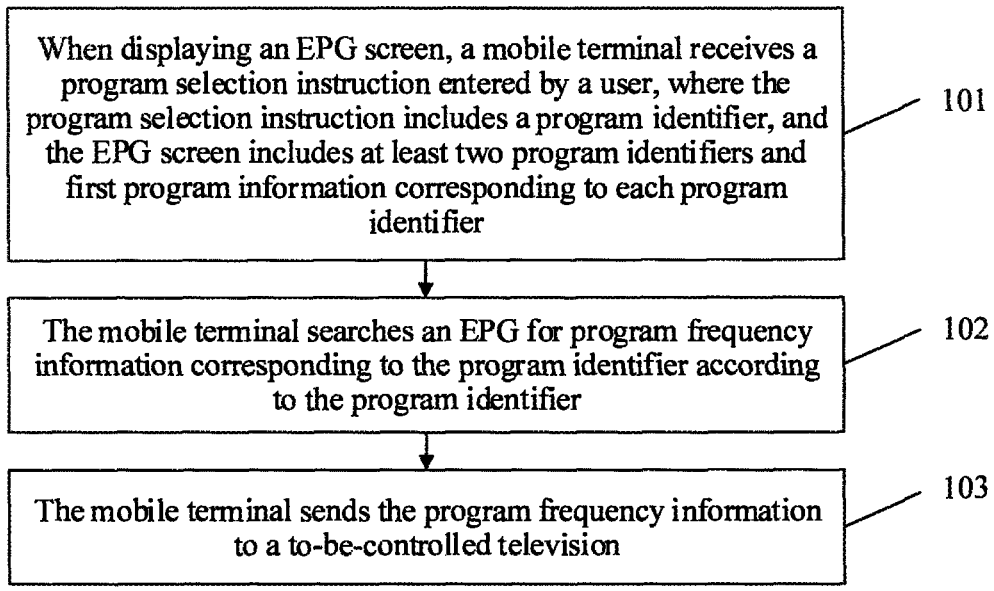
FIG. 1 is a flowchart of a television program switching method according to an embodiment of the present disclosure.
FIG. 2 is a schematic diagram of an example of an EPG screen displayed by a mobile terminal in a television program switching method according to an embodiment of the present disclosure.

An embodiment of the present disclosure provides a television program switching method. The method is applied to a mobile terminal, and the mobile terminal includes an EPG. The EPG includes at least two program identifiers and program frequency information corresponding to each program identifier. As shown in FIG. 1, the method includes the following steps.

Step 101: When displaying an EPG screen, the mobile terminal receives a program selection instruction entered by a user, where the program selection instruction includes a program identifier, and the EPG screen includes at least two program identifiers and first program information corresponding to each program identifier.

The program selection instruction is used to switch a program using the program identifier. The first program information may include information displayed on the EPG screen, for example, a program name or a program picture corresponding to a program identifier. The at least two program identifiers and first program information corresponding to each program identifier that are included in the EPG screen may be program identifiers of all programs that can be played on a to-be-controlled television and first program information corresponding to each program identifier. The program identifiers included in the EPG screen displayed on the mobile terminal are the same as the program identifiers included in the EPG on the mobile terminal. A quantity of program identifiers included in the EPG or the EPG screen is determined according to an actual situation, and the quantity of program identifiers is not limited in the present disclosure. It may be understood that because a display screen of the mobile terminal is limited in size, the EPG screen is divided into multiple pages, and each page includes a preset quantity of program identifiers and first program information corresponding to each of the preset quantity of program identifiers. For convenience of user viewing, the preset quantity may be determined according to the size of the display screen of the mobile terminal. The user may view all the program identifiers and the first program information corresponding to each program identifier that are included in the EPG screen by flipping pages upward/downward or leftward/rightward.

It is noteworthy that the EPG screen includes the program identifiers. When the EPG screen is displayed on the mobile terminal, the user may use the EPG screen to select a program that the user wants to watch. Specific operations may be as follows. The user taps a program identifier or first program information corresponding to a program identifier in the EPG screen, and the mobile terminal obtains a tapping position according to the tapping operation, and obtains the program identifier according to the tapping position. It may be understood that the tapping operation of the user corresponds to the program selection instruction in this step.

The program identifier may be represented in a form of a number, a character, or the like. For example, the program identifier may be a television channel 168, or a television station China Central Television-1 (CCTV-1).

Step 102: The mobile terminal searches the EPG for program frequency information corresponding to the program identifier according to the program identifier.

The program frequency information includes a frequency corresponding to the program identifier. For example, a frequency corresponding to CCTV-1 is 200 megahertz (MHz).

Step 103: The mobile terminal sends the program frequency information to a to-be-controlled television.

It is noteworthy that the program frequency information sent by the mobile terminal to the to-be-controlled television is program frequency information that can be recognized by the to-be-controlled television.

The mobile terminal sends the frequency information to the to-be-controlled television using such as an infrared ray or a radio wave after finding the frequency information corresponding to the program identifier in order to control the to-be-controlled television.

According to the television program switching method provided in this embodiment of the present disclosure, when displaying an EPG screen, a mobile terminal receives a program selection instruction entered by a user, and the program selection instruction includes a program identifier. The mobile terminal searches an EPG for program frequency information corresponding to the program identifier according to the program identifier. Then, the mobile terminal sends the program frequency information to a to-be-controlled television such that the to-be-controlled television switches to a program corresponding to the program frequency information. In comparison with the other approaches in which a user needs to frequently switch channels to view program information corresponding to each channel, in the present disclosure, a mobile terminal displays an EPG screen, and the EPG screen includes at least two program identifiers and first program information corresponding to each program identifier. Therefore, the user can directly view, on the EPG screen, all pieces of program information included in the EPG screen, and select a program of interest to the user. The mobile terminal may control a to-be-controlled television to directly switch to the program selected by the user, thereby resolving a problem of cumbersome user operations of viewing television program information, and improving user experience.

Optionally, as shown in FIG. 2, the present disclosure provides a schematic diagram of an EPG screen. With reference to the method procedure shown in FIG. 1, a mobile terminal currently displays an EPG screen, and the EPG screen includes program information corresponding to each program identifier. On the EPG screen, a user can view program information of some programs, for example, News Broadcast, Animal World, or the like. The user may determine a program that the user wants to watch according to the program information. For example, if the user wants to watch Animal World, the user taps a display position of Animal World on the EPG screen shown in FIG. 2. The mobile terminal obtains the tapping position according to the tapping operation of the user, and then determines that a program identifier corresponding to the tapping position is China Central Television-2 (CCTV-2). Then, the mobile terminal searches an EPG for frequency information corresponding to CCTV-2, and sends the frequency information to a to-be-controlled television such that the to-be-controlled television switches a program according to the frequency information.

It may be understood that FIG. 2 is only an example of the schematic diagram of the EPG screen. Content displayed on the EPG screen is not limited to content shown in FIG. 2. The program information displayed on the EPG screen includes not only a program name, but may also include a program picture corresponding to the program name. Because a display screen of the mobile terminal is limited in size, more program information may be viewed by flipping pages leftward/rightward or upward/downward.

Figure 3:
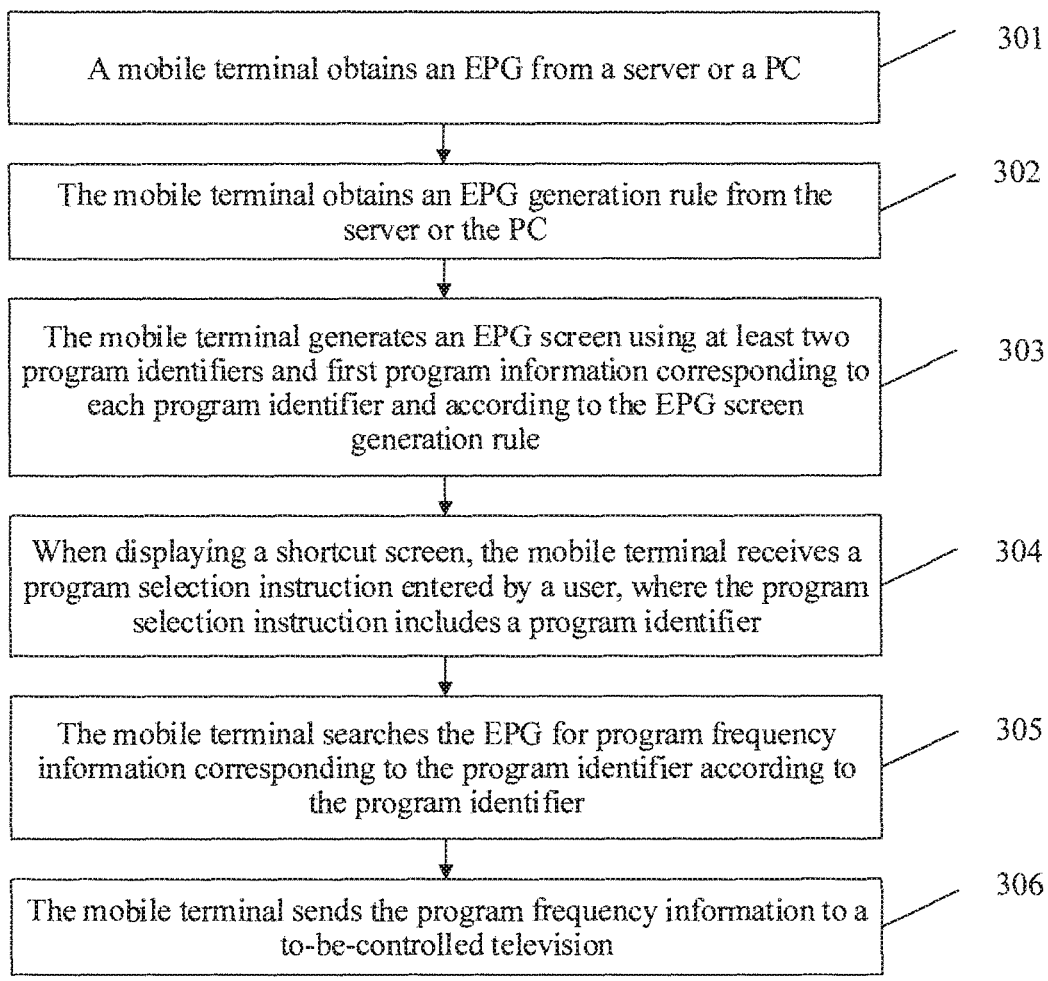
FIG. 3 is a flowchart of another television program switching method according to an embodiment of the present disclosure.

With reference to FIG. 1 and FIG. 2, the present disclosure further provides a television program switching method. As shown in FIG. 3, the method includes the following steps.

Step 301: A mobile terminal obtains an EPG from a server or a PC.

The EPG includes not only at least two program identifiers and program frequency information corresponding to each program identifier, but also second program information corresponding to each program identifier. The second program information includes first program information.

The second program information includes information such as a program name, a program picture, or a program introduction of each day part in a preset time period corresponding to each program identifier.

The mobile terminal may directly download the EPG from the server using a wireless network. Further, the mobile terminal may download the EPG using one wireless network of a second generation mobile communications technology (2G) network, a third generation mobile communications technology (3G) network, a fourth generation mobile communications technology (4G) network, or a WI-FI network. When the mobile terminal cannot access the wireless network, the EPG may be downloaded from the server using the PC, and then the mobile terminal obtains the EPG from the PC by means of wired connection to the PC, BLUETOOTH transmission, or the like. It may be understood that the PC is a transmission medium between the mobile terminal and the server.

Optionally, the mobile terminal may include an EPG client. A user needs to obtain an EPG from a server or a PC when first using the EPG client, and stores the obtained EPG in an EPG client file of the mobile terminal.

It is noteworthy that because a playing schedule of a television program changes according to an actual situation, program information in the EPG is updated in real time. Optionally, the mobile terminal may receive an EPG update message after the EPG is updated. After receiving the EPG update message, the mobile terminal may update, by downloading updated EPG content, the EPG stored in the mobile terminal in order to ensure real-time accuracy of program information displayed on an EPG screen.

Step 302: The mobile terminal obtains an EPG generation rule from the server or the PC.

The EPG screen generation rule is used to stipulate how to generate the EPG screen using the at least two program identifiers and the program information corresponding to each program identifier that are in the EPG.

In addition, a method for obtaining the EPG screen generation rule is the same as a method for obtaining the EPG, and details are not described herein. Optionally, the EPG screen generation rule obtained by the mobile terminal may be stored in the EPG client file of the mobile terminal.

It is noteworthy that a sequence of obtaining the EPG and the EPG screen generation rule is not limited in the present disclosure. For example, the mobile terminal may first obtain the EPG and then obtain the EPG screen generation rule, or may first obtain the EPG screen generation rule and then obtain the EPG, or may obtain the EPG and the EPG screen generation rule at the same time. A sequence of performing step 301 and step 302 is not limited in the present disclosure. FIG. 3 shows an example in which step 301 is performed first.

Step 303: The mobile terminal generates an EPG screen using at least two program identifiers and first program information corresponding to each program identifier and according to the EPG screen generation rule.

It may be understood that the at least two program identifiers herein are all program identifiers obtained by the mobile terminal from the EPG.

Optionally, after the EPG screen is generated, the EPG screen is used as a home screen displayed by the EPG client. The program identifiers and the program information corresponding to the program identifier that are displayed on the EPG screen are associated with the program frequency information in the EPG stored in the mobile terminal.

It is noteworthy that the EPG screen includes a shortcut screen and a specific program information screen. Basic program information corresponding to a program identifier is displayed on the shortcut screen, for example, a current program name and picture, or the like. It may be understood that the basic program information corresponding to the program identifier is first program information corresponding to the program identifier. Detailed program information corresponding to a program identifier is displayed on the specific program information screen, and may be a program name, a program picture, a program introduction, or the like of each day part in a preset time period corresponding to the program identifier. The preset time period may be usually one day. It may be understood that the detailed program information corresponding to the program identifier is a part of content in second program information corresponding to the program identifier. For example, the first program information includes a program name, a program picture, a program introduction, or the like of each time period in a week, while only a program name of each day part in one day is displayed on the specific program information screen.

The shortcut screen and the specific program information screen may be displayed on a display screen of the mobile terminal at the same time, or either may be separately displayed on a display screen of the mobile terminal in different situations.

The mobile terminal receives an operation entered by the user on the shortcut screen. A method for distinguishing whether the operation entered by the user is used to control a to-be-controlled television to switch a program or used to open a specific program information screen is not limited in the present disclosure. For example, a shortcut screen may include a link for opening a specific program information screen. FIG. 2 shows a shortcut screen, and a program News Broadcast in FIG. 2 is used as an example. The mobile terminal opens a specific program information screen corresponding to CCTV-1 after receiving a tapping operation of the user in a CCTV-1 display area under a News Broadcast display area, or after receiving a tapping operation of the user in a program information (News Broadcast) display area above a CCTV-1 display area, the mobile terminal controls the to-be-controlled television to switch a program. Alternatively, after receiving a single tapping operation of the user in a News Broadcast or CCTV-1 display area in FIG. 2, the mobile terminal controls the to-be-controlled television to switch a program, or the mobile terminal opens a specific program information screen corresponding to CCTV-1 after receiving a double tapping operation of the user in a News Broadcast display area or CCTV-1 display area in FIG. 2.

A specific program information screen may be displayed in the following two manners.

Figure 4:
FIG. 4 is a schematic diagram of an example of a specific program information screen displayed by a mobile terminal in a television program switching method according to an embodiment of the present disclosure.

In a first manner, as shown in FIG. 4, a specific program information screen is directly displayed on a current shortcut screen.

Figure 5:
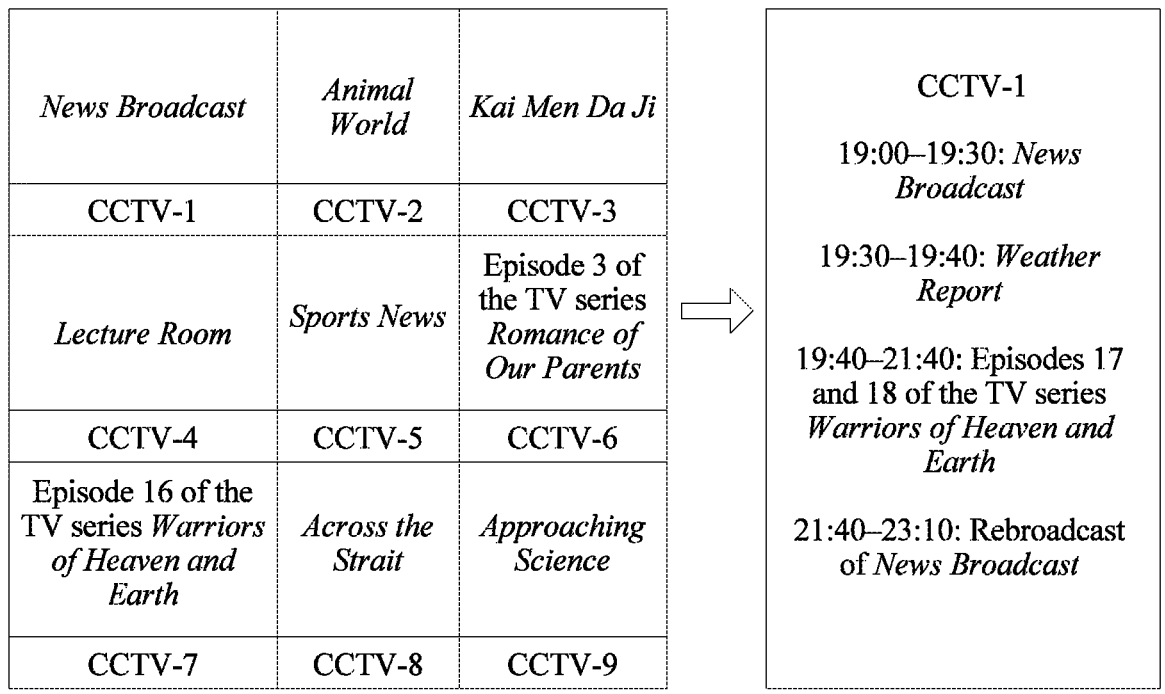
FIG. 5 is a schematic diagram of another example of a specific program information screen displayed by a mobile terminal in a television program switching method according to an embodiment of the present disclosure.

In a second manner, as shown in FIG. 5, a current shortcut screen is switched to a specific program information screen.

It is noteworthy that FIG. 4 and FIG. 5 are only examples of schematic diagrams, and detailed program information shown in FIG. 4 and FIG. 5 is program information of a time period 17:00-23:10. In an actual situation, both a program trailer and historical program information may be displayed on a specific program information screen, and a date may be further displayed in front of a specific time period.

Further, it may be understood that step 301 to step 303 are steps performed by the mobile terminal to control functions of the to-be-controlled television. After generating the EPG screen, the mobile terminal may switch a television program according to a program selection instruction entered by the user, and step 301 to step 303 do not need to be performed in advance each time step 304 is performed.

Step 304: When displaying a shortcut screen, the mobile terminal receives a program selection instruction entered by a user, where the program selection instruction includes a program identifier.

It is noteworthy that before the mobile terminal controls the to-be-controlled television to switch a program, the mobile terminal further needs to convert the frequency information corresponding to each program identifier in the EPG to a format that can be recognized by the to-be-controlled television.

Step 305: The mobile terminal searches the EPG for program frequency information corresponding to the program identifier according to the program identifier.

Step 306: The mobile terminal sends the program frequency information to a to-be-controlled television.

It may be understood that a format of the program frequency information in this step is a format that can be recognized by the to-be-controlled television.

According to the television program switching method provided in this embodiment of the present disclosure, when displaying an EPG screen, a mobile terminal receives a program selection instruction entered by a user, and the program selection instruction includes a program identifier. The mobile terminal searches an EPG for program frequency information corresponding to the program identifier according to the program identifier. Then, the mobile terminal sends the program frequency information to a to-be-controlled television such that the to-be-controlled television switches to a program corresponding to the program frequency information. In comparison with the prior art in which a user needs to frequently switch channels to view program information corresponding to each channel, in the present disclosure, a mobile terminal displays a shortcut screen of an EPG screen, and the shortcut screen includes all program identifiers in the EPG and first program information corresponding to each program identifier. Therefore, the user can directly view, on the shortcut screen, information of all programs that can be played on a to-be-controlled television, and select a program of interest to the user. Alternatively, the user can view specific program information of each day part on a specific program information screen of an EPG screen in order to determine a play time of a program of interest to the user, thereby resolving a problem of cumbersome user operations of viewing television program information, and improving user experience.

Figure 6:
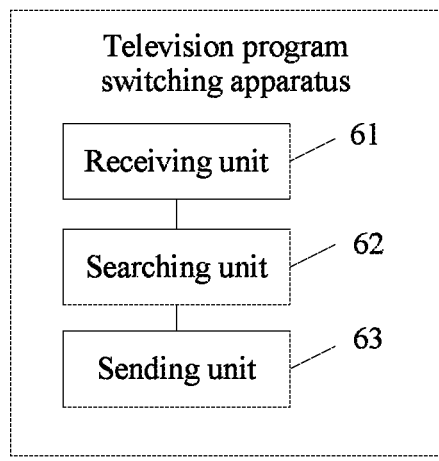
FIG. 6 is a schematic diagram of a logical structure of a television program switching apparatus according to an embodiment of the present disclosure.

With reference to FIG. 1 to FIG. 5, an embodiment of the present disclosure provides a television program switching apparatus. As shown in FIG. 6, the apparatus is applied to a mobile terminal, the mobile terminal includes an EPG, and the EPG includes program identifiers of at least two programs and program frequency information corresponding to each program identifier. The apparatus includes a receiving unit 61, a searching unit 62, and a sending unit 63.

The receiving unit 61 is configured to receive, when an EPG screen is displayed, a program selection instruction entered by a user, where the program selection instruction includes a program identifier, and the EPG screen includes at least two program identifiers and first program information corresponding to each program identifier, and provide the program identifier for the searching unit 62.

The searching unit 62 is configured to search the EPG for program frequency information corresponding to the program identifier according to the program identifier.

The sending unit 63 is configured to send the program frequency information found by the searching unit 62 to a to-be-controlled television.

According to the television program switching apparatus provided in this embodiment of the present disclosure, when an EPG screen is displayed, a receiving unit 61 receives a program selection instruction entered by a user, and the program selection instruction includes a program identifier. A searching unit 62 searches an EPG for program frequency information corresponding to the program identifier according to the program identifier. Then, a sending unit 63 sends the program frequency information to a to-be-controlled television such that the to-be-controlled television switches to a program corresponding to the program frequency information. In comparison with the other approaches in which a user needs to frequently switch channels to view program information corresponding to each channel, in the present disclosure, a mobile terminal displays an EPG screen, and the EPG screen includes at least two program identifiers and first program information corresponding to each program identifier. Therefore, the user can directly view, on the EPG screen, all pieces of program information included in the EPG screen, and select a program of interest to the user. The mobile terminal may control a to-be-controlled television to directly switch to the program selected by the user, thereby resolving a problem of cumbersome user operations of viewing television program information, and improving user experience.

Figure 7:
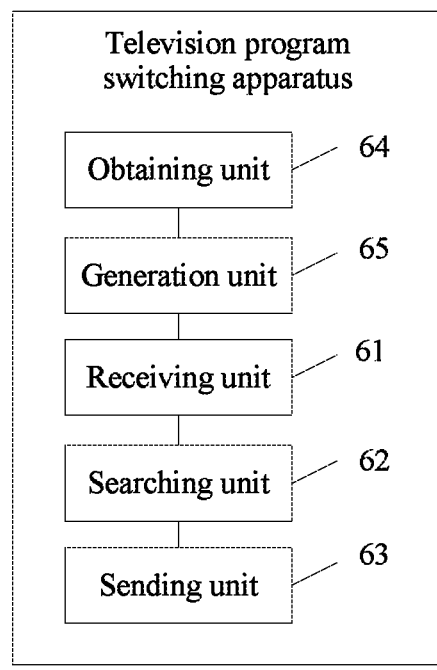
FIG. 7 is a schematic diagram of a logical structure of another television program switching apparatus according to an embodiment of the present disclosure.

With reference to FIG. 6, the present disclosure further provides a television program switching apparatus. As shown in FIG. 7, the apparatus further includes an obtaining unit 64 and a generation unit 65.

The obtaining unit 64 is configured to obtain the EPG from a server or a PC.

The EPG further includes second program information corresponding to each program identifier, and the second program information includes first program information.

It is noteworthy that the mobile terminal may directly download the EPG from the server using a wireless network. Further, the mobile terminal may download the EPG using one wireless network of a 2G network, a 3G network, a 4G network, or a WI-FI network. When the mobile terminal cannot access the wireless network, the EPG may be downloaded from the server using the PC, and then the mobile terminal obtains the EPG from the PC by means of wired connection to the PC, BLUETOOTH transmission, or the like. It may be understood that the PC is a transmission medium between the mobile terminal and the server.

The obtaining unit 64 is further configured to obtain an EPG screen generation rule from the server or the PC.

A method for obtaining the EPG screen generation rule is the same as a method for obtaining the EPG, and details are not described herein.

The generation unit 65 is configured to generate an EPG screen using at least two program identifiers and first program information corresponding to each program identifier and according to the EPG screen generation rule obtained by the obtaining unit 64.

It may be understood that a receiving unit 61 can receive, only after the generation unit 65 generates the EPG screen and when the EPG screen is displayed, a program selection instruction entered by the user.

According to the television program switching apparatus provided in this embodiment of the present disclosure, when an EPG screen is displayed, a receiving unit 61 receives a program selection instruction entered by a user, and the program selection instruction includes a program identifier. A searching unit 62 searches an EPG for program frequency information corresponding to the program identifier according to the program identifier. Then, a sending unit 63 sends the program frequency information to a to-be-controlled television such that the to-be-controlled television switches to a program corresponding to the program frequency information. In comparison with the other approaches in which a user needs to frequently switch channels to view program information corresponding to each channel, in the present disclosure, a mobile terminal displays an EPG screen, and the EPG screen includes at least two program identifiers and first program information corresponding to each program identifier. Therefore, the user can directly view, on the EPG screen, all pieces of program information included in the EPG screen, and select a program of interest to the user. The mobile terminal may control a to-be-controlled television to directly switch to the program selected by the user, thereby resolving a problem of cumbersome user operations of viewing television program information, and improving user experience.

Figure 8:
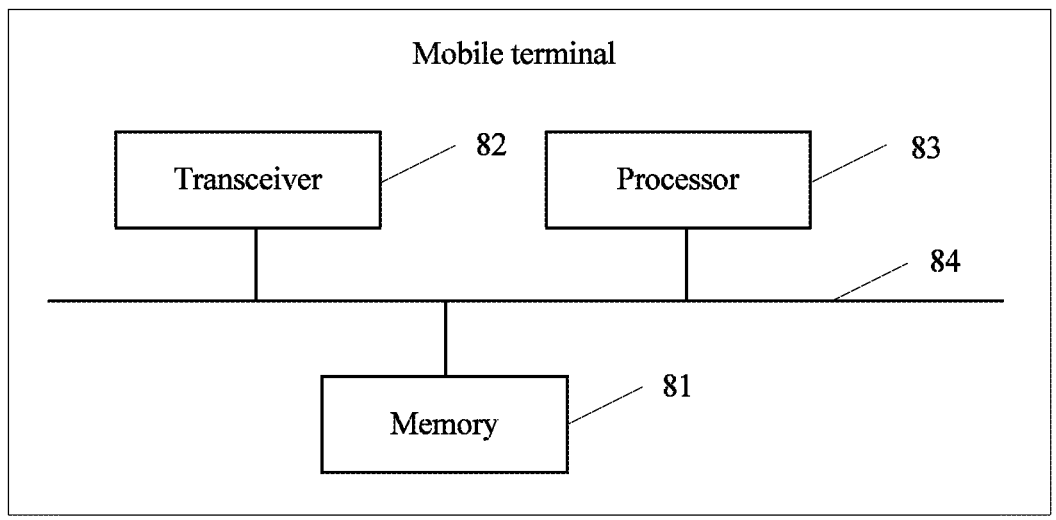
FIG. 8 is a schematic diagram of a logical structure of a mobile terminal in a television program switching method according to an embodiment of the present disclosure.

As shown in FIG. 8, FIG. 8 is a schematic structural diagram of hardware of the mobile terminal described in FIG. 1 to FIG. 5. The mobile terminal may include a memory 81, a transceiver 82, a processor 83, and a bus 84, and the memory 81, the transceiver 82, and the processor 83 are communicatively connected with each other using a bus 84.

The memory 81 may be a read-only memory (ROM), a static storage device, a dynamic storage device, or a random access memory (RAM). The memory 81 may store an operating system and another application program. When the technical solution provided in this embodiment of the present disclosure is implemented using software or firmware, program code implementing the technical solution provided in this embodiment of the present disclosure is stored in the memory 81 and executed by the processor 83.

The transceiver 82 is used for communication between the apparatus and another device or another communications network (by way of example and not limitation, an Ethernet, a radio access network (RAN), a wireless local area network (WLAN), or the like).

A general-purpose central processing unit (CPU), a microprocessor, an application specific integrated circuit (ASIC), or one or more integrated circuits may be used as the processor 83. The processor 83 is configured to execute a related program in order to implement the technical solution provided in this embodiment of the present disclosure.

The bus 84 may include a path used to transfer information between all parts (for example, the memory 81, the transceiver 82, and the processor 83) of the mobile terminal.

It should be noted that although the hardware shown in FIG. 8 includes only the memory 81, the transceiver 82, the processor 83, and the bus 84, in a specific implementation process, a person skilled in the art should understand that the mobile terminal further includes another component required for a normal operation. In addition, a person skilled in the art should understand that a hardware component for implementing another function may be further included according to a specific requirement.

Further, the mobile terminal shown in FIG. 8 includes an EPG, and the EPG includes program identifiers of at least two programs and program frequency information corresponding to each program identifier. When the mobile terminal implements the apparatus in the embodiments corresponding to FIG. 6 to FIG. 7, the transceiver 82 in the mobile terminal is configured to receive, when an EPG screen is displayed, a program selection instruction entered by a user, where the program selection instruction includes a program identifier, and the EPG screen includes the at least two program identifiers and first program information corresponding to each program identifier, and provide the program identifier for the processor 83.

The processor 83 is coupled to the memory 81 and the transceiver 82 configured to control execution of a program instruction, and further configured to search the EPG for program frequency information corresponding to the program identifier according to the program identifier.

The transceiver 82 is further configured to send the program frequency information found by the processor 83 to a to-be-controlled television.

The transceiver 82 is further configured to obtain the EPG from a server or a PC.

The EPG further includes second program information corresponding to each program identifier, and the second program information includes the first program information.

The memory 81 is further configured to store the EPG obtained by the transceiver 82.

The transceiver 82 is further configured to obtain an EPG screen generation rule from the server or the PC.

The memory 81 is further configured to store the EPG screen generation rule obtained by the transceiver 82.

The processor 83 is further configured to generate the EPG screen using the at least two program identifiers and the first program information corresponding to each program identifier and according to the EPG screen generation rule.

It may be understood that the transceiver 82 can receive the program selection instruction entered by the user only after the processor 83 generates the EPG screen and when the EPG screen is displayed.

According to the television program switching method provided in this embodiment of the present disclosure, when an EPG screen is displayed, a transceiver 82 receives a program selection instruction entered by a user, and the program selection instruction includes a program identifier. A processor 83 searches an EPG for program frequency information corresponding to the program identifier according to the program identifier. Then, the transceiver 82 sends the program frequency information to a to-be-controlled television such that the to-be-controlled television switches to a program corresponding to the program frequency information. In comparison with the other approaches in which a user needs to frequently switch channels to view program information corresponding to each channel, in the present disclosure, a mobile terminal displays an EPG screen, and the EPG screen includes at least two program identifiers and first program information corresponding to each program identifier. Therefore, the user can directly view, on the EPG screen, all pieces of program information included in the EPG screen, and select a program of interest to the user. The mobile terminal may control a to-be-controlled television to directly switch to the program selected by the user, thereby resolving a problem of cumbersome user operations of viewing television program information, and improving user experience.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in another manner. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communications connections may be implemented using some interfaces. The indirect couplings or communications connections between the apparatuses or units may be implemented in electronic, mechanical, or another form.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, applied to a mobile terminal comprising a display, wherein the method comprises:
    displaying a first user interface on the display, wherein the first user interface comprises a first television channel and a second television channel, wherein the first television channel comprises a first channel name, a first current program name of a first current program that is currently broadcast on the first television channel, a first forecasting program name of a first forecasting program that is to be broadcast on the first television channel after the first current program, and a first picture related to the first television channel, and wherein the second television channel comprises a second channel name, a second current program name of a second current program that is currently broadcast on the second television channel, a second forecasting program name of a second forecasting program that is to be broadcast on the second television channel after the second current program, and a second picture related to the second television channel;
    detecting a first gesture on the first television channel, by a user, on the display;
    displaying a second interface on the display in response to detecting the first gesture, wherein the second interface comprises the first current program name, a first time period corresponding to the first current program name, the first forecasting program name, a second time period corresponding to the first forecasting program name, a third forecasting program name of a third forecasting program that is to be broadcast on the first television channel after the first forecasting program, a third time period corresponding to the third forecasting program name, and a date;
    detecting a second gesture on the first television channel, by the user, on the display, the second gesture being different from the first gesture; and
    sending an instruction to a television in response to detecting the second gesture, wherein the instruction causes the television to play the first current program, wherein the first current program name, the first forecasting name, the second current program name, the second forecasting program name, and the third forecasting program name are downloaded from a server by the mobile terminal via a wireless network.

2. The method of claim 1, wherein the first forecasting program name and the third forecasting program name are in a preset time period.

3. The method of claim 1, wherein the preset time period is one or more days.

4. The method of claim 1, wherein the first current program name and the first forecasting program name are updated in real time.

5. The method of claim 1, wherein the first interface comprises several pages.

6. The method of claim 1, wherein the first television channel is CCTV-1.

7. The method of claim 1, wherein the first television channel is obtained from the server.

8. A mobile terminal, comprising
    a display;
    a processor coupled to the display; and
    a memory coupled to the processor and storing programming instructions for execution by the processor, wherein the programming instructions cause the processor to be configured to:
        display a first user interface on the display, wherein the first user interface comprises a first television channel and a second television channel, wherein the first television channel comprises a first channel name, a first current program name of a first current program that is currently broadcast on the first television channel, a first forecasting program name of a first forecasting program that is to be broadcast on the first television channel after the first current program, and a first picture related to the first television channel, and wherein the second television channel comprises a second channel name, a second current program name, a second forecasting program name of a second current program that is currently broadcast on the second television channel, and a second picture related to the second television channel;
        detect a first gesture on the first television channel, by a user, on the display;
        display a second interface on the display in response to detecting the first gesture, wherein the second interface comprises the first current program name, a first time period corresponding to the first current program name, the first forecasting program name, a second time period corresponding to the first forecasting program name, a third forecasting program name of a third forecasting program that is to be broadcast on the first television channel after the first forecasting program, a third time period corresponding to the third forecasting program name, and a date;
        detect a second gesture on the first television channel, by the user, on the display, wherein the second gesture is different from the first gesture; and
        send an instruction to a television in response to detecting the second gesture, wherein the instruction causes the television to play the first current program, wherein the first current program name, the first forecasting program name, the second current program name, the second forecasting program name, and the third forecasting program name are downloaded from a server by the mobile terminal via a wireless network.

9. The mobile terminal of claim 8, wherein the first forecasting program name and the third forecasting program name are in a preset time period.

10. The mobile terminal of claim 8, wherein the preset time period is one or more days.

11. The mobile terminal of claim 8, wherein the first current program name and the first forecasting program name are updated in real time.

12. The mobile terminal of claim 8, wherein the first interface comprises several pages.

13. The mobile terminal of claim 8, wherein the first television channel is CCTV-1.

14. The mobile terminal of claim 8, wherein the first television channel is obtained from the server.

15. A non-transitory computer-readable medium storing computer executable instructions which cause a mobile terminal comprising a display to be configured to:
  display a first user interface on the display, wherein the first user interface comprises a first television channel and a second television channel, wherein the first television channel comprises a first channel name, a first current program name of a first current program that is currently broadcast on the first television channel, a first forecasting program name of a first forecasting program that is to be broadcast on the first television channel after the first current program, and a first picture related to the first television channel, and wherein the second television channel comprises a second channel name, a second current program name of a second current program that is currently broadcast on the second television channel, a second forecasting program name of a second forecasting program that is to be broadcast on the second television channel after the second current program, and a second picture related to the second television channel;
  detect a first gesture on the first television channel, by a user, on the display;
  display a second interface on the display, wherein the second interface comprises the first current program name, a first time period corresponding to the first current program name, the first forecasting program name, a second time period corresponding to the first forecasting program name, a third forecasting program name of a third forecasting program that is to be broadcast on the first television channel after the first forecasting program, a third time period corresponding to the third forecasting program name, and a date;
  detect a second gesture on the first television channel, by the user, on the display, wherein the second gesture is different from the first gesture; and
  send an instruction to a television, the instruction causing the television to play the first current program, wherein the first current program name, the first forecasting program name, the second current program name, the second forecasting program name, and the third forecasting program name are downloaded from a server by the mobile terminal via a wireless network.

16. The non-transitory computer-readable medium of claim 15, wherein the first forecasting program name and the third forecasting program name are in a preset time period.

17. The non-transitory computer-readable medium of claim 15, wherein the preset time period is one or more days.

18. The non-transitory computer-readable medium of claim 15, wherein the first current program name and the first forecasting program name are updated in real time.

19. The non-transitory computer-readable medium of claim 15, wherein the first interface comprises several pages.

20. The non-transitory computer-readable medium of claim 15, wherein the first television channel is obtained from the server.

* * * * *